United States Patent

Magarill

[11] Patent Number: 5,604,624
[45] Date of Patent: Feb. 18, 1997

[54] OPTICAL SYSTEM FOR PROJECTION DISPLAY

[75] Inventor: Simon Magarill, Cincinnati, Ohio

[73] Assignee: Corning Incorporated, Corning, N.Y.

[21] Appl. No.: 465,205

[22] Filed: Jun. 5, 1995

Related U.S. Application Data

[62] Division of Ser. No. 44,720, Apr. 12, 1993, Pat. No. 5,552,922.

[51] Int. Cl.⁶ .............................. G02B 26/08; G02B 5/04
[52] U.S. Cl. ................ 359/224; 359/291; 359/833; 359/834; 359/855; 353/81
[58] Field of Search ........................... 359/224, 230, 359/291, 618, 627, 629, 638, 639, 640, 726, 833, 834, 835, 837, 850, 855; 353/33, 81

[56] References Cited

U.S. PATENT DOCUMENTS

| | | | |
|---|---|---|---|
| 2,456,521 | 12/1948 | Maxwell | 359/834 |
| 4,783,156 | 11/1988 | Yokota | 359/833 |
| 4,948,228 | 8/1990 | Keens | 359/834 |
| 4,969,730 | 11/1990 | Van Den Brandt | 353/31 |

Primary Examiner—Ricky D. Shafer
Attorney, Agent, or Firm—William J. Chervenak

[57] ABSTRACT

An image projection system wherein light provided from a source passes through a prism and is then incident on an array of reflecting elements which are individually adjustable between a first and second position. Light reflected from each element re-enters the prism. Light from elements in the first position pass through the prism and into a lens. Light from elements in the second position travel through the prism, but do not enter the lens. The principal plane of the lens and the plane in which the elements are located are each parallel to the adjacent surface of the prism.

2 Claims, 4 Drawing Sheets

OPTICAL SYSTEM FOR PROJECTION DISPLAY

This is a division of U.S. patent application Ser. No. 08/044,720, filed Apr. 12, 1993, now U.S. Pat. No. 5,552,922.

BACKGROUND OF THE INVENTION

A variety of systems exist which are useful for projecting images or information, for example, images of the type associated with television displays or information of the type seen at airports to indicate the departure of a plane. Many of these systems employ a device which selectively reflects incident light rays provided by a light source. One such system is disclosed in U.S. Pat. No. 4,680,579, and includes a component often referred to as deformable mirror device. Projection systems which employ a deformable mirror device also include a light source which provides illuminating light to the deformable mirror device (DMD).

The DMD is comprised of a plurality of relatively small mirrors, all of which are contained in a common plane. Each mirror is movable, in response to a signal, between first and second positions, where the respective positions may be identified as "on" or "off". Considering a particular mirror in such a display, if it is in the "on" position, incident illuminating light is then reflected to the viewer. In contrast, if the mirror is in the "off" position, the incident illuminating light is reflected elsewhere and is not visible to the viewer. Thus, by appropriately positioning the mirrors contained in the array, a particular image may be projected to the viewer.

With respect to mirrors which are in the "on" position, light reflected therefrom is often passed through a lens or lens system, of appropriate design, which focuses the reflected light. In addition, the reflected light from a mirror in the "on" position may be transmitted to a screen, whereupon the viewer views the image formed on the mirror array by viewing the screen.

Summarizing the overall construction and operation of projection systems which employ DMDs, it will be appreciated that they comprise a light source, an array of individually adjustable mirrors for selectively reflecting light from the light source, and means for insuring a transmission of the illuminating light from the light source to the DMD, and similarly insuring the appropriate transmission of light reflected from mirrors "on" position, through a lens or in general to the viewer of the projected image.

Systems of the type described above are generally known in the art. Example of such systems are those disclosed in U.S. Pat. Nos. 1,713,213, and 1,984,683 and 3,186,115 and 3,161,726 and 4,680,508. U.S. Pat. No. 4,969,730 is particularly illustrative of such systems.

Considering further the construction and operation of such systems, as noted, such systems generally include means for insuring the transmission of the light from the light source to the DMD, and from the DMD to the viewer. In the prior art, such means generally included mirrors or so called Schlierin devices. Also used in the prior art were so called Dyson Relays. In general, all such devices, i.e Schlierin devices, mirrors and Dyson Relays, resulted in systems having large dimensions and, in addition, often resulted in poor projected images which were characterized by glare or ghost images or both, when the projected image was projected on a screen. One objective of my invention is to provide improved means for transmitting illuminating light from a light source to a selectively reflecting device, such as a DMD, and from the reflecting device to a lens system which, in turn, transmit the light to, for example, a screen.

A further objective of my invention is to provide an improved component for such a system wherein light rays reflected from reflecting elements in the "on" position pass through the component to a receiving lens, but light rays from elements in the "off" position are refracted away from the receiving lens.

Another object of my invention is to provide an overall arrangement of the components of such a system whereby a superior image is obtained.

SUMMARY OF THE INVENTION

In an image projection system which includes a light source providing illuminating light and a reflecting device which receives light from said light source and is comprised of a plurality of reflecting elements, e.g. mirrors which comprise a DMD, which are individually adjustable between a first or "on" position, and a second or "off" position, there is provided a prism which is positioned in the light path between the light source and the reflecting device and is also positioned such that light reflected from the mirrors of the reflecting device also passes through the prism. Included within the prism are two spaced apart surfaces. Light from the light source is incident upon one of said surfaces and, by total internal reflection, is reflected to the reflecting device. Additionally, the spaced apart surfaces are positioned and constructed such that light reflected from a mirror passes through the spaced apart surfaces.

Light from reflecting elements in the "on" position passes through the prism and into a lens system wherein the principal plane of the lens system is parallel to the reflecting device. In addition to the lens, the overall projection system may include a screen which receives the light from the lens.

The prism includes two substantially parallel side surfaces, an entrance surface which is obliquely disposed with respect to the side surfaces, and two spaced surfaces within the prism which are parallel and define an air space therebetween. The prism is arranged in the optical path of the system such that illuminating light from the light source enters the prism through the entrance surface and, by total internal reflection, is reflected from one of the surfaces which defines the air space. Light thus reflected exits from the prism through one of the side surfaces and is incident upon the plane which contains the deformable mirrors. Light incident upon any mirror is reflected back through the aforementioned side surface and is then incident upon, and passes through, the first of the surfaces which defines the aforementioned air space. Such light passes through this surface because it is incident upon the surface at an angle less than the critical angle. Similarly, such light is incident upon the second of the surfaces, which defines the air space, and passes therethrough because it is incident upon that surface at an angle less than Brewster's angle. Thereafter, in one embodiment of my invention, such light exits from the prism at the second of the side surfaces, regardless of whether the mirror which reflected the light was in the "off" or the "on" position.

Light reflected from a mirror in the "off" position also passes through the prism device and, in the first embodiment of my invention, also exits from the prism from a side surface, but, if a mirror is in the "off" position, the angle of any light ray from such a mirror will be outside of the acceptance angle of the lens associated with the prism, or does not enter the lens because of an aperture stop, and thereby does not pass through the lens and is not seen by the viewer.

Another embodiment of my invention employs a prism of the type described above. However, additionally, a second pair of spaced apart surfaces are provided and receive light reflected from the mirrors and which has passed through the first pair of spaced apart surfaces. The function of the second pair of spaced apart surfaces is to split light from "on" or "off" mirrors, so that such light exits from the prism through different surfaces, depending on whether the light is from a mirror in the "on" position or a mirror in the "off" position.

The use of systems of the above described type is characterized by improved optical performance and compactness of design.

DETAILED DESCRIPTION OF THE INVENTION

Figure 1:
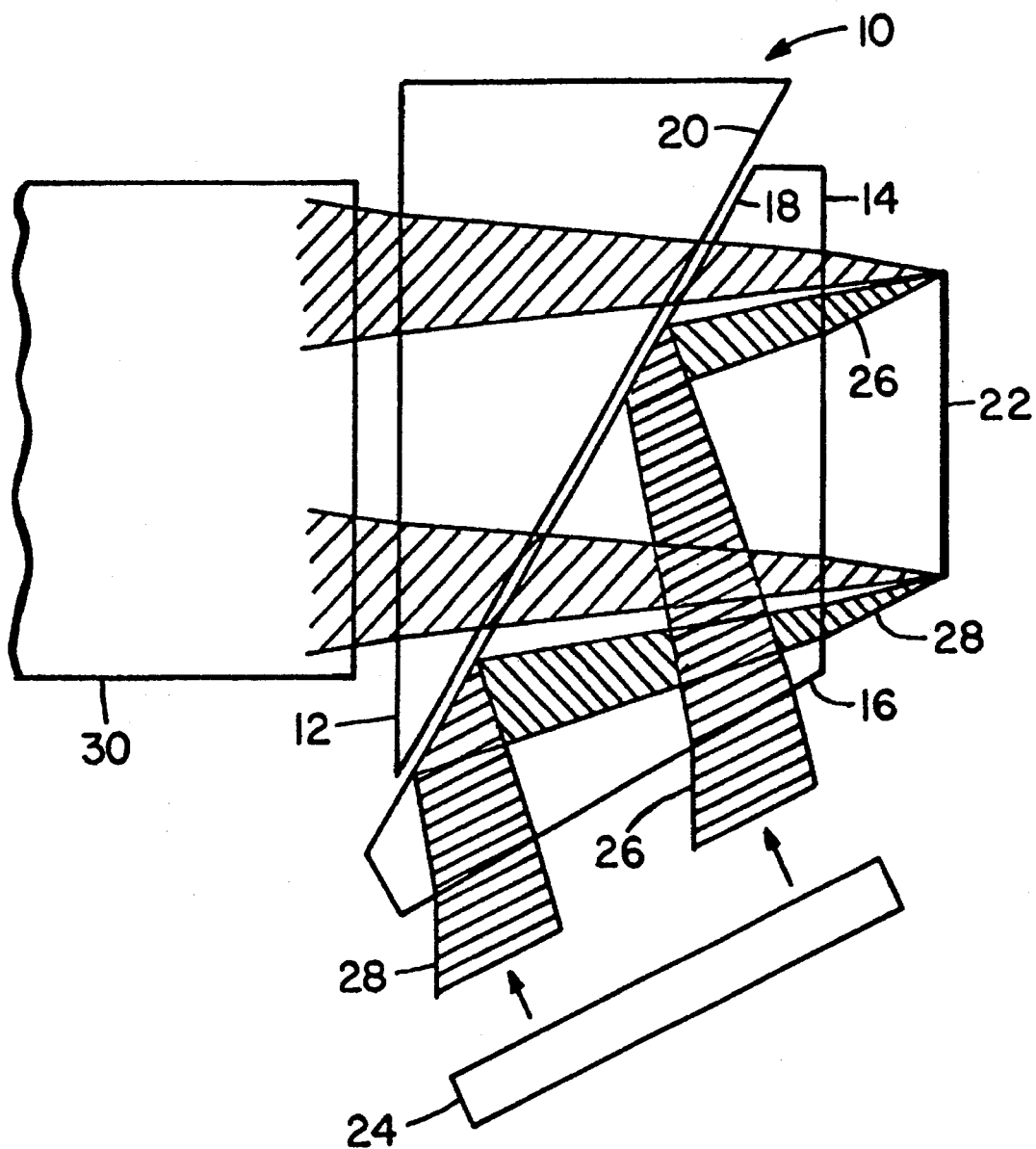
FIG. 1 shows the overall construction of an image projection system which embodies my invention.

FIG. 1 shows an embodiment of my invention. Thus, there is shown a prism 10, which includes first and second exterior side surfaces 12 and 14, respectively which are parallel to each other. The prism 10 is further defined by an entrance surface 16, which is disposed in a plane oblique to the parallel planes containing the side surfaces 12 and 14. In addition, within the prism 10 are first and second surfaces 18 and 20, which are substantially parallel and define an airspace therebetween. Also, it will be seen that first and second surfaces 18 and 20 are in a plane which is transverse to the planes which include the parallel side surfaces 12 and 14, as well as being transverse to the plane which contains the entrance surface 16. Second exterior side surface 14 and first surface 18 make up a first pair of spaced apart surfaces. First exterior surface 12 and second surface 20 make up a second pair of spaced apart surfaces.

Although I refer to the prism 10 as a unitary article, functionally it may be considered as being comprised of two parts, namely a first part bounded by the surfaces 14, 16 and 18, and the second part which includes the surfaces 20 and 12.

The prism may be constructed of any optical quality material. A particular material which I have used is polymethylmethacrylate.

Considering the prism 10 in more detail, it was noted above that, as shown in FIG. 1, the planes which include the surfaces 18 and 20, and the plane which includes the surface 16, are transverse to the side surfaces 12 and 14. More specifically, the orientation of the surfaces is such that the surface 16 is parallel to the image of the surface 14, which is created by reflection of surface 14 from the surface 18. This orientation requirement thus defines the angular orientation of the surface 18 and the surface 16 vis-a-vis the surface 14. As previously noted, the surface 12 is substantially parallel to the surface 14, and the surface 20 is substantially parallel to the surface 18.

Figure 4:
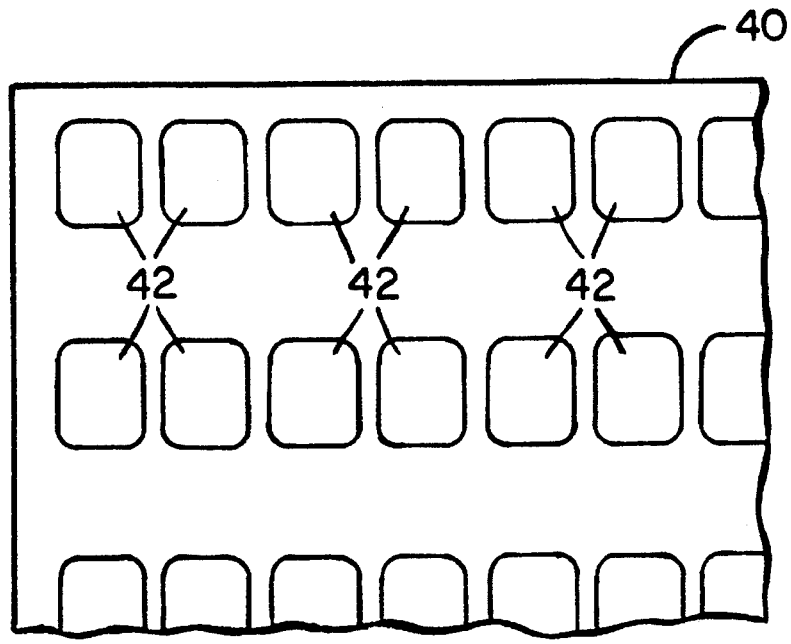
FIGS. 4, 5 and 6 are schematic representations of a deformable mirror device.
Figure 5:
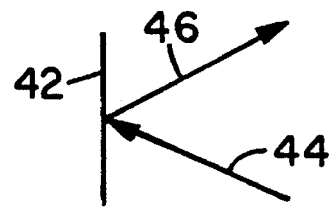
Figure 6:
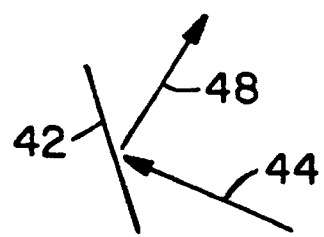

As further shown in the drawing, a deformable mirror device 22 is disposed adjacent to and substantially parallel with side surface 14. Because the construction of deformable mirror devices is generally known and shown in the prior art, for example, U.S. Pat. No. 4,680,579, the details thereof will not be described herein. Suffice it to say that the DMD 40, as shown schematically in FIG. 4 is comprised of a plurality of mirrors 42, all of which are contained in a substantially common plane. In addition, associated with the DMD is appropriate means for individually moving each of the plurality of mirrors from a first (on) position, to a second (off) position. In FIG. 5, a representative mirror 42 is shown in a first ("on") position. In FIG. 6 the mirror 42 is shown in a second ("off") position. Thus, it will be seen the incident light ray 44 is reflected at a different angle, as shown by reflected rays 44 and 46, when the mirror 42 is moved from an "on" position to an "off" position.

With further regard to the drawing, the DMD is positioned with a respect to the surface 14 such that light reflected from the mirrors is reflected to, and incident upon, the surface 18 at an angle less than Brewster's angle, and thus passes through the prism 10.

As also shown in the drawing, a light source 24 is positioned to supply illuminating light to the entrance surface 16. As suggested by the drawing, the light source 24 is oriented such that the light rays from the light source 24 are not orthogonal to the entrance surface 16. This geometry is required for the following reason.

First, it will be appreciated that if the light which exited the prism at surface 14 was orthogonal to surface 14, it would also be orthogonal to the DMD 22 and, if that was true, light reflected from a mirror would simply travel, in reverse, the path followed the illuminating light. Thus, it will be seen that light exiting the prism at surface 26 should not be orthogonal to surface 26.

Second, because of the above described relation between surfaces 14, 18 and 16, i.e. the fact that surface 16 is parallel to the image of surface 14 reflected from surface 18, it follows that the angle of incidence of a ray entering at surface 16 will be the same as the angle between that ray and surface 14, when that ray exits through surface 14. Therefore, because rays should not exit the prism orthogonally to surface 14, the angle of incidence of rays entering the prism at surface 16 also should not be orthogonal to surface 16. When these conditions are satisfied, then, as shown in FIG. 1, the bundles of rays 26 or 28 enter and leave the prism transverse to the respective surfaces, 16 and 14, and are transversely incident on the different mirrors, whereby the light reflected from the mirrors re-enters the prism along a different path.

As further shown in the drawing, desirably a projection lens is disposed adjacent to the side surface 12. With regard to the projection lens, it should be noted that I prefer to employ my invention in a projection system which, overall, includes a telecentric projection lens and a screen which receives light from the projection lens. However, as those skilled in the art will recognize, a variety of arrangements may be employed which do not necessarily require the use of either a projection lens or a screen, but which, nevertheless, can advantageously use my invention in combination with a deformable mirror device and a source of illuminating light. Thus, it will be appreciated that the drawings show the preferred embodiments of my invention.

Figure 2:
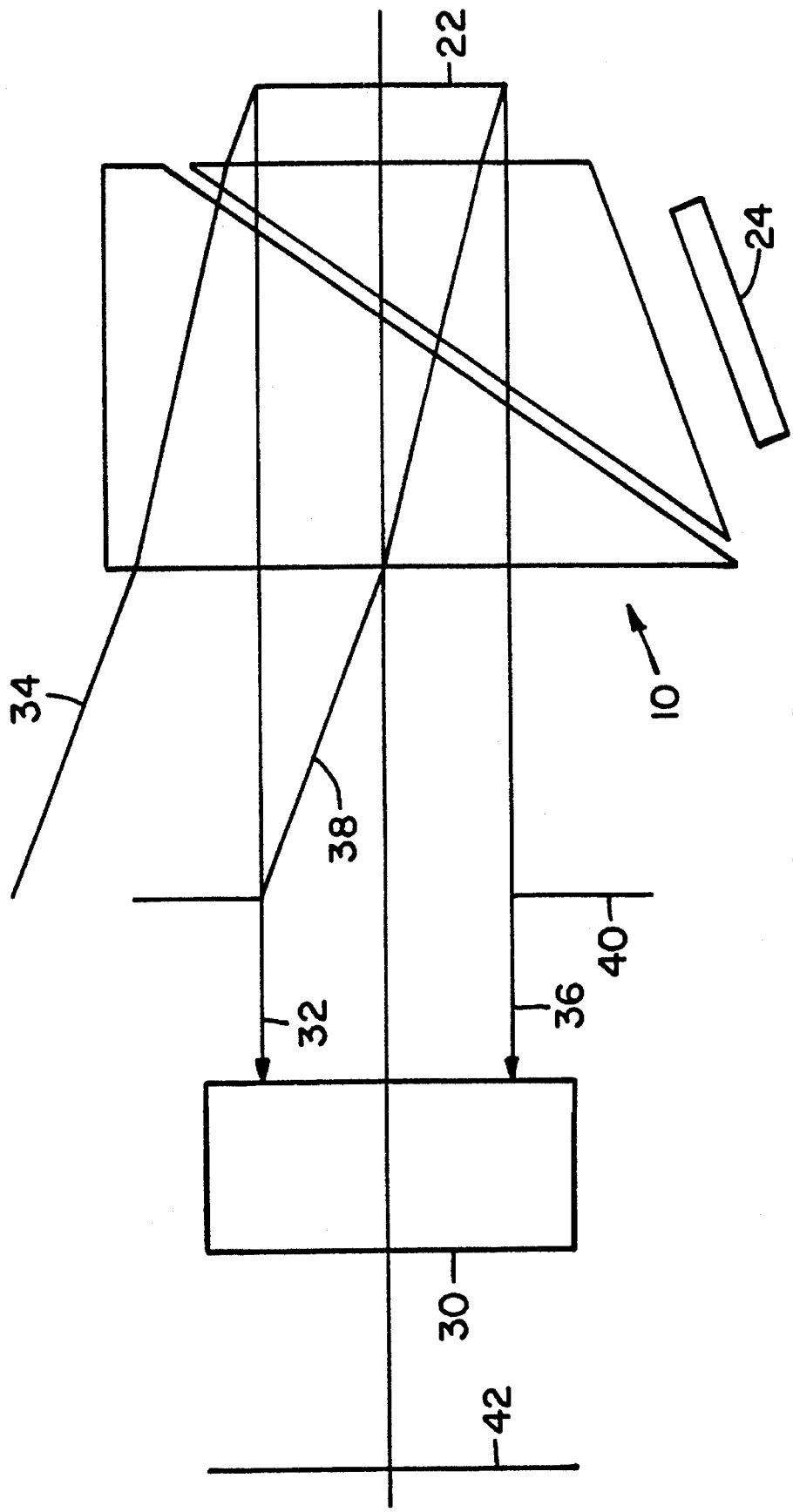
FIG. 2 is another view of the system shown in FIG. 1.

A particularly important facet of my invention, as shown in both FIGS. 1 and 2, is the spatial orientation of lens system 30. More particularly, it will be noted that the frontal plane 58 of the lens system 30 is parallel to the plane defining the front of the device 22. This arrangement is important to ensure the correct image formation. The fact that the frontal plane 58 is and can be parallel to the device 22 is attainable because of the geometry and construction of the prism 10. In the absence of this overall orientation, image distortion is likely to occur.

Considering now the overall operation of the system shown in the FIG. 1, illuminating light provided by the light source 24 is incident upon the entrance surface 16, and, after traveling through the lower portion of the prism, the illuminating light is incident upon the first-surface 18. The angle of incidence between the illuminating light rays and the surface 18 is greater than Brewster's angle. As a consequence, the light from the light source 24 is reflected, by total internal reflection, to the device or DMD 22. As is conventional in the display of optical systems, in the drawing the light rays are shown which are incident upon the top and bottom of the DMD 22.

Considering the adjustable mirrors at the top and bottom of the DMD 22, incident light rays 26 and 28 are reflected back into the prism and pass through the side surface 14. Such reflected light rays next encounter the surface 18 upon which they are incident. However, the angle of incidence between the reflected light rays and the first surface 18 is less than the critical angle and, as a result, the reflected light rays pass through the surface 18. Similarly, the light rays which pass through the surface 18 also substantially pass through the surface 20 because here the light passes from the air to the optical material which comprises the prism and total internal reflection (or Brewster's condition) does not exist in this case. The reflected light rays then pass through the remainder of the prism and exit through the side surface 12. FIG. 2 shows one arrangement whereby the system of FIG. 1 may be utilized. Specifically, FIG. 2 shows an arrangement whereby light which is reflected from mirrors in the "off" position does not enter the projection lens 30. Referring to FIG. 2, for clarity the light rays from the light source 24 and which are incident on the DMD 22 are not shown. Also, only single reflected rays from two positions on the DMD 22 are shown. Additionally, interposed between the projection lens 30 and the prism 10 is the entrance pupil 40 of the lens.

Considering the top portion of the DMD 22, ray 32 is the ray which would be reflected from the top most mirror in the DMD 22, when that mirror was in the "on" position. Ray 34 is the ray which would be reflected from the same mirror when it was in the "off" position. As will be seen, the entrance pupil 40 is sized and positioned such that ray 34 does not enter the pupil, but ray 32 does enter the pupil and thereafter may enter the lens 30. Similarly, ray 36 is reflected from a mirror at the bottom of the DMD 22 and passes through the entrance pupil 40, while ray 38, which is reflected from the same mirror but in the "off" position, falls outside the pupil, and does not enter the lens 30. Rays which pass through the lens may then be incident upon screen 42.

In summary, it will be seen that the entrance pupil may be used to stop from the lens 30 rays from mirrors in the "off" position. For telecentric lenses, a similar result may be secured by appropriately sizing the acceptance angle of the lens 30, whereby rays from mirrors in the "off" position fall outside the cone defined by the acceptance angle.

In a specific example of the construction shown in FIG. 1, I would employ a telecentric lens having a f-number equal to 3.0, and I would employ acrylate, having a refractive index of 1.493, as the material for the prism. The spacing between the surfaces 18 and 20 would be approximately 0.05 mm. With such a construction, and employing a DMD with mirrors which have on/off positions of +10° and 0°, respectively, the light from the light source would be imaged on the entrance surface 16 at an angle of 20.5°.

Figure 3:
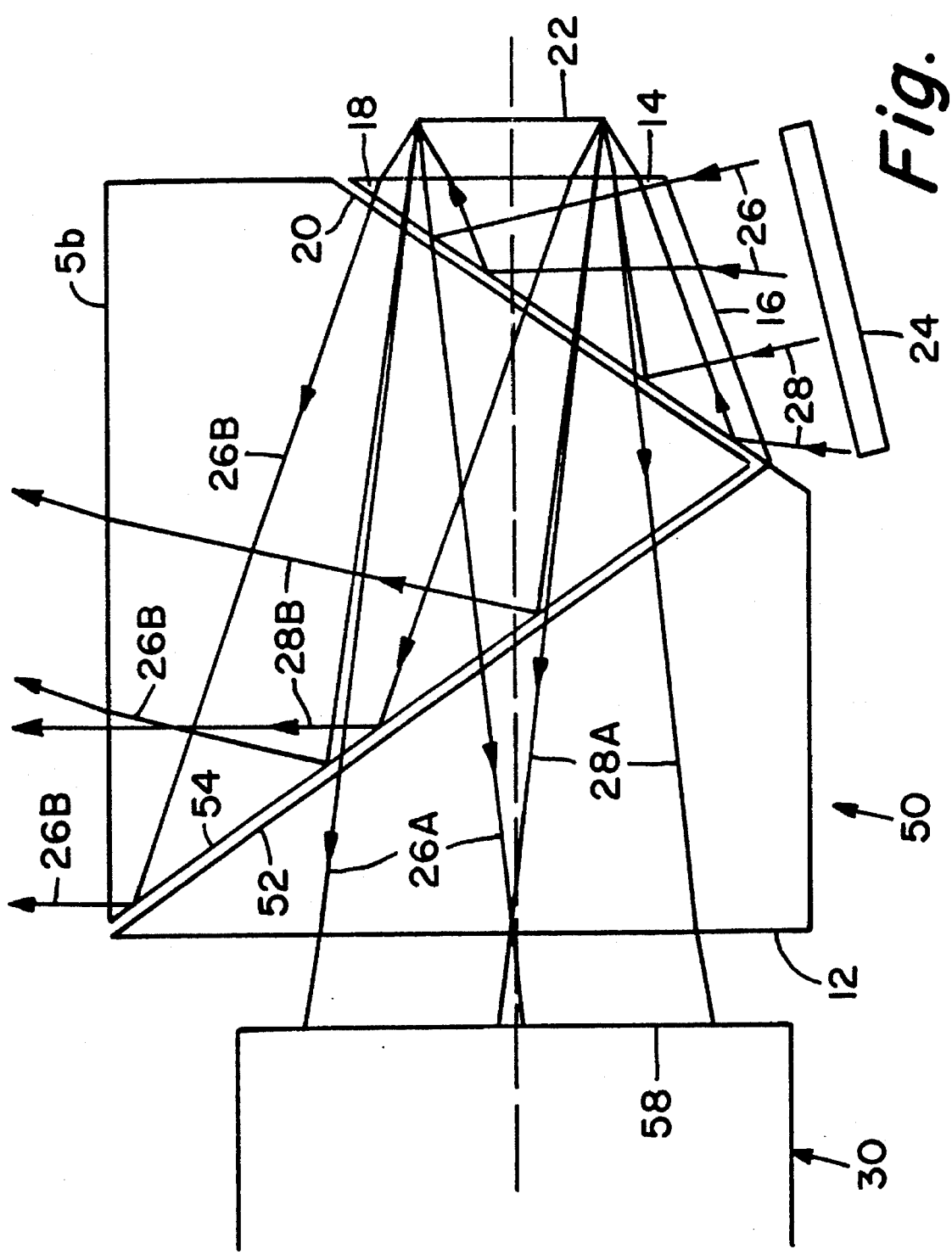
FIG. 3 shows another embodiment of my invention.

Referring to FIG. 3, another embodiment of my invention is shown. Parts of the embodiment shown in FIG. 3 which are common to the embodiment of FIG. 1 have the same reference numbers. The embodiment of FIG. 3 differs from the embodiment of FIG. 1 in that, in the FIG. 3 embodiment, light rays from mirrors in the "off" position do not exit from the prism through the surface adjacent to the projection lens 30. Instead, they are reflected away from the projection lens, viz. upwardly through the prism as shown in FIG. 3. This result is achieved by providing a prism 50 which includes a second pair of spaced apparent, parallel surfaces, 52 and 54. The surfaces 52 and 54 are oriented at the smallest angle which provides total internal reflection from surface 54 for all rays which are reflected from mirrors in the "off" position. With this construction and orientation, the following operation is achieved.

The rays 28 from light source 24 enter the prism through surface 16 and, as heretofore described, are reflected from surface 18, by total internal reflection, to the mirror at the bottom of the DMD 22. If that mirror is in the "on" position, the bundle of reflected rays, which bundle is bounded by the rays 28A, passes through the surface 14, passes through the surface 18 because the angle of incidence with surface 18 is less than Brewster's angle, passes through the surface 20 because the light passes from air to the optical material of the prism, passes through the surface 54 because the angle is less than the Brewster's angle, passes through the surface 52 because the light passes from air to the optical material of the prism, exits through surface 12, and enters the projection lens 30.

In contrast, if the mirror at the bottom of DMD 22 is in the "off" position, then the bundle of rays from that mirror also passes through the surface 14 and the surfaces 18 and 20. However, when that bundle of rays, which is bounded by the rays 28B, strikes the surface 54, the angle of incidence is greater than Brewster's angle, and consequently those rays are reflected upwardly and exit the prism through the surface 56, as shown in FIG. 3.

A similar result occurs with respect to the rays reflected from the mirror at the top of the DMD 22. When that mirror is in the "on" position, the bundle of rays, bounded by the rays 26A, passes through the prism for the same reasons that rays 28A passed through the prism, and the bundle bounded by rays 26A exits the prism through surface 12. In contrast, when the mirror at the top of the DMD 22 is in the "off" position, the bundle of rays therefrom, which is bounded by the rays 26B, is reflected from the surface 54 and exits the prism through the surface 56. In other words, those rays do not enter the lens 30.

Considering the overall arrangement shown in the drawings, and the particular arrangement and construction of the prism 10, a number of noteworthy features should be observed. First, it is clear that a particularly compact arrangement is achieved because the illuminating light source 24, the DMD 22 and the projection lens 30 may be in close proximity. In addition, as may be noted from a close inspection of the various light rays shown, the illuminating light rays each travel an equal distance through the prism. Thus, the light rays 26 and 28 each travel substantially the same distance through the prism 10 during their path from surface 16 to the surface 14.

In summary, as shown in the drawing and hereinbefore described, my invention provides a compact, efficient and desirable arrangement for image formation in a system employing a deformable mirror device and an illuminating light source, and which preferably includes a projection lens.

Although a specific embodiment of my invention has hereinbefore been described, it will be appreciated by those skilled in the art that other embodiments may be conceived, without nevertheless departing from the scope of my invention as described in the appended claims.

I claim:

1. An image projection system which comprises:

a) a light source;

b) an array of adjustable mirrors which reflect light incident thereupon and received from said light source;

c) A projection lens system which receives and transmits light reflected from said array of mirrors;

d) a prism disposed in the light path between said light source and said array of mirrors, and also disposed in the light path between said array of mirrors and said lens system, said prism including first and second pairs of spaced apart surfaces, said first pair of surfaces being disposed to receive and reflect light from said light source to said array of mirrors and being further disposed to allow light reflected from said mirrors to pass therethrough, said second pair of surfaces being disposed to receive light which passes through said first pair of surfaces and to reflect light from said mirrors in a second position and to allow light reflected from said mirrors in a first position to pass therethrough.

2. The image projection system of claim 1 wherein said prism includes:

a) first and second exterior side surfaces which are, respectively, adjacent to said mirrors and said lens; and b) an entrance surface which is disposed obliquely with respect to said first and second side exterior surfaces and is disposed adjacent to said light source.

* * * * *